United States Patent [19]

Panicali

[11] 4,344,124

[45] Aug. 10, 1982

[54] START-UP TIMER FOR A SWITCHING POWER SUPPLY

[75] Inventor: Natalino Panicali, Schaumburg, Ill.

[73] Assignee: Motorola, Inc., Schaumburg, Ill.

[21] Appl. No.: 22,756

[22] Filed: Mar. 22, 1979

[51] Int. Cl.³ ............................................. H02P 13/22
[52] U.S. Cl. ........................................ 363/49; 363/26; 363/97
[58] Field of Search ....................... 363/26, 49, 56, 97, 363/134

[56] References Cited

U.S. PATENT DOCUMENTS

| 4,121,282 | 10/1978 | Ohsawa | 363/21 |
| 4,180,852 | 12/1979 | Koizumi et al. | 363/49 |

OTHER PUBLICATIONS

C. J. Palmucci, "Switching Regulator Start-Up Circuit", IBM Technical Disclosure Bulletin, vol. 19, No. 3, Aug. 1976, pp. 978–979.

*Primary Examiner*—William M. Shoop
*Assistant Examiner*—Peter S. Wong

*Attorney, Agent, or Firm*—Rolland R. Hackbart; James W. Gillman

[57] ABSTRACT

Improved start-up circuitry is disclosed for a switching power supply including transformer inverting circuitry that is responsive to a pulse-width-modulated gating signal for providing a DC output voltage from an AC input voltage. The switching power supply further includes comparing circuitry for comparing the DC output voltage to a reference voltage and providing an error signal proportional to the difference therebetween, and control circuitry for pulse-width modulating the gating signal in response to the error signal. After initial AC power turn-on or after subsequent AC power interruptions, the start-up circuitry momentarily enables the control circuitry to pulse-width modulate the gating signal at a maximum duty cycle. The gating signal is otherwise pulse-width modulated at a minimum duty cycle by the control circuitry until the error signal is established. By momentarily pulse-width modulating the gating signal at a maximum duty cycle, the switching power supply may deliver a large amount of energy for quickly providing the DC output voltage under full load conditions.

7 Claims, 2 Drawing Figures

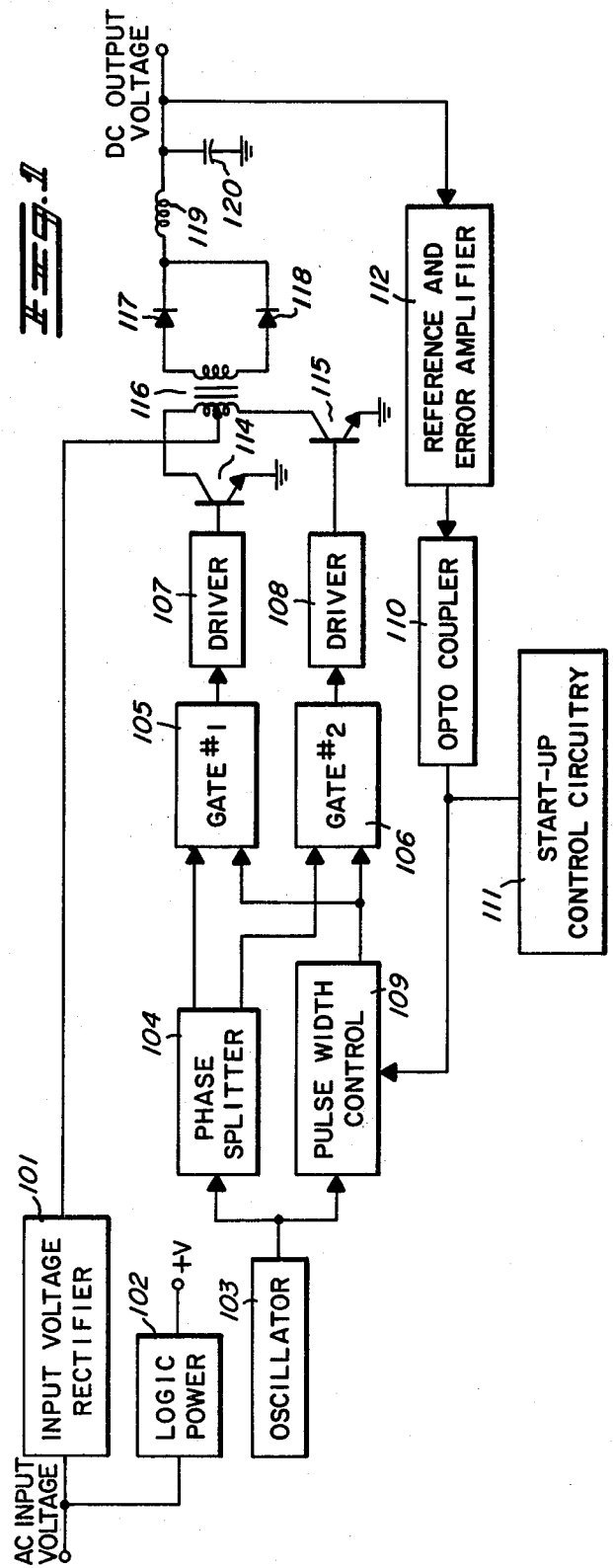

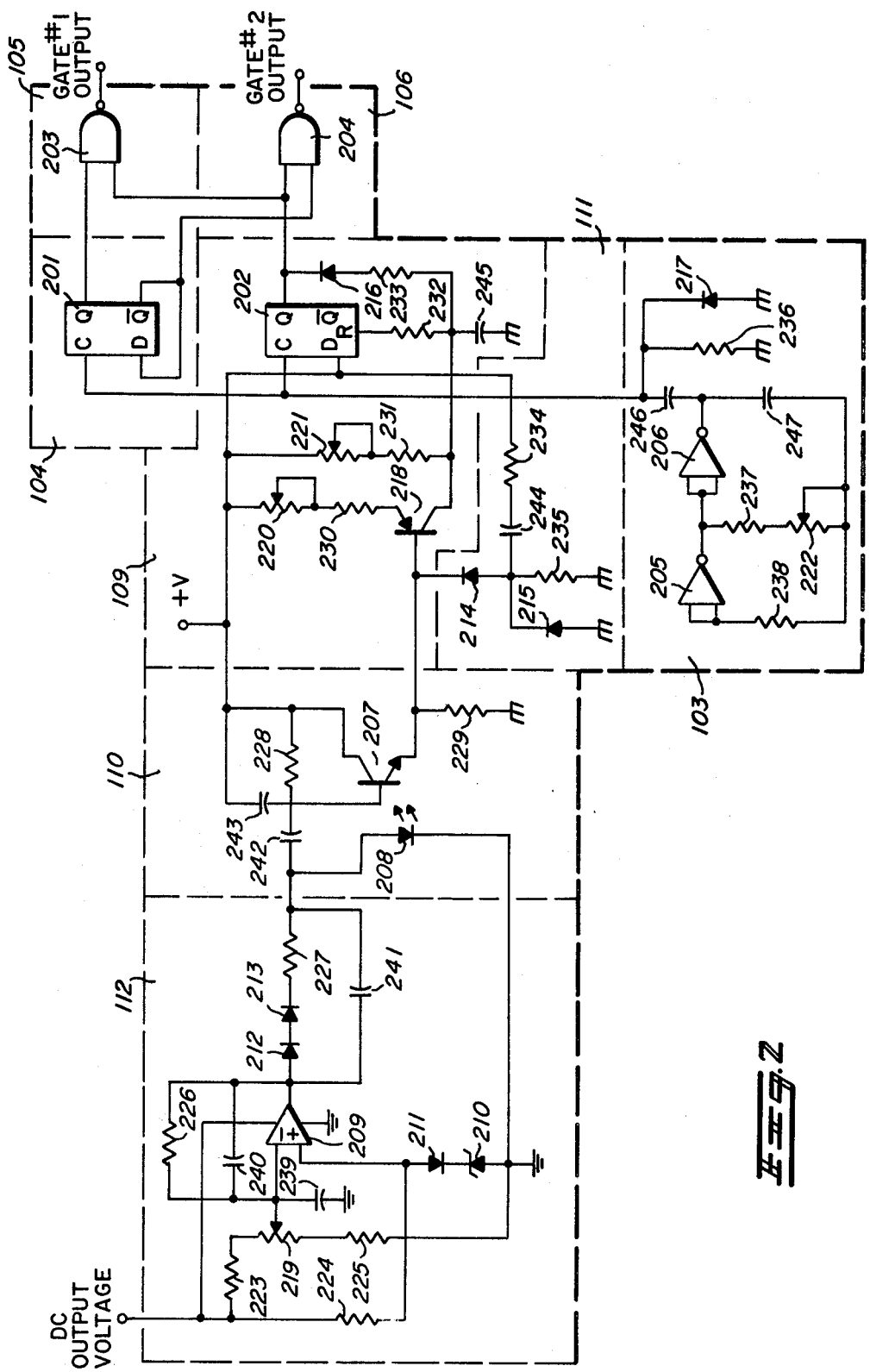

START-UP TIMER FOR A SWITCHING POWER SUPPLY

BACKGROUND OF THE INVENTION

The present invention relates to switching power supplies, and more particularly to start-up circuitry for switching power supplies.

Switching power supplies are preferred over other types of power supplies in many applications primarily because of their small size and high efficiency operation. In designing such switching power supplies, care must be taken to prevent overvoltage conditions and overcurrent conditions which may damage circuitry of the switching power supply unless corrective action is taken. Overvoltage conditions may be detected by voltage sensing circuitry, which when activated disables power supply operation permanently by severing fusible lines or temporarily by shutting down until the over voltage condition disappears. To prevent excessive dissipation of power supply devices, circuitry may be included for detecting overcurrent conditions and likewise temporarily shutting down until the overcurrent condition disappears. Upon detection of overvoltage or overcurrent conditions, switching power supplies are disabled by limiting the current delivered to the load. Because of the presence of overvoltage and overcurrent detecting circuitry, most switching power supplies limit the current that can be delivered to the load initially at turn-on of, and after interruption of, the power source. Since the current is limited, the time required to reach the rated DC output voltage will be relatively long when the power supply is subject to heavy capacitive loads which may exceed full load capability.

Accordingly, it is an object of the present invention to provide an improved switching power supply that under momentary conditions exceeding rated full load conditions, will provide the rated DC output voltage in a relatively short period of time after initial turn-on or subsequent interruptions of the power source.

BRIEF DESCRIPTION OF THE INVENTION

According to the invention, there is provided a switching power supply that is adapted to provide a DC output voltage from an AC input voltage supplied by an AC voltage source. The switching power supply further includes transformer inverting circuitry responsive to a pulse width modulated gating signal for providing the DC output voltage, comparing circuitry for comparing the DC output voltage to a reference voltage and providing an error signal proportional to the difference therebetween; and control circuitry for pulse width modulating the gating signal in response to the error signal. The control signal initially pulse width modulates the gating signal at a predetermined minimum duty cycle after initial turn-on and interruptions of the AC input voltage. The control circuitry further includes start-up circuitry that is responsive to an interruption of the AC input voltage for enabling the control circuitry to pulse-width modulate the gating signal at a predetermined maximum duty cycle for a predetermined time interval following normal reapplication of the AC input voltage. Thus, at initial turn-on and for subsequent interruptions of the AC input voltage, the gating signal is pulse-width modulated at a predetermined maximum duty cycle for enabling the transformer inverting circuitry to raise the DC output voltage sufficiently such that the desired DC output voltage may be reached within a relatively short period of time even when subject to heavy capacitive loads exceeding rated full load conditions.

BRIEF DESCRIPTION OF THE DRAWINGS

FIG. 1 is a block diagram of a switching power supply embodying the present invention.

FIG. 2 is a detailed circuit diagram of corresponding blocks of the switching power supply of FIG. 1.

DETAILED DESCRIPTION OF THE PREFERRED EMBODIMENT

In FIG. 1, there is illustrated a switching power supply that is adapted to provide a DC output voltage from an AC input voltage provided by an AC voltage source. In the preferred embodiment, the AC input voltage is 120 VAC and the DC output voltage is +24 volts. The AC input voltage is coupled to input voltage rectifier 101 which provides a full wave rectified output to the center tap of the primary winding of transformer 116. The AC input voltage is also coupled to logic power circuitry 102, which may be a conventional transformer coupled series regulator that provides the supply voltage +V, for powering the logic and control circuitry of blocks 103-111. In the preferred embodiment, the supply voltage, +V, is 12 volts.

The switching control circuitry 103-112 provides pulse-width-modulated gating signals to transistors 114 and 115 for transferring energy via transformer 116, diodes 117 and 118 and inductor 119 to capacitor 120 for providing the DC output voltage. The basic theory of operation of such switching power supplies is described in detail in application note, AN-719, entitled "A New Approach to Switching Regulators", by R. J. Haver, published by Motorola Semiconductor Products, Inc., 1975 and in Application Note AN-737A, entitled "Switched Mode Power Supplies-Highlighting a 5-V, 40-A Inverter Design", by R. J. Haver, published by Motorola Semiconductor Products, Inc., 1977. As pointed out in the foregoing application notes, switching power supplies are typically much smaller in size than other types of power supplies, while still providing high efficiency power conversion.

An important feature of the switching power supply of FIG. 1 is that isolation is maintained between the ground reference of the AC input voltage and the ground reference of the DC output voltage. Isolation is achieved by means of optical coupling circuitry 110, which utilizes a light emitting diode (LED) that couples the signal from reference and error amplifier 112 by means of light rays to a photo transistor which is further coupled to the pulse-width control circuitry 109 and start-up circuitry 111. Since the feedback path is provided by light coupling, essentially total isolation is maintained between the AC input voltage and DC output voltage.

Referring to FIG. 2, there is illustrated in detail the circuitry comprising the blocks 103-112 of FIG. 1. Oscillator 103 is a conventional astable multivibrator formed by two CMOS gates 205 and 206, capacitor 247 and resistors 237, 238 and 222. The design of a CMOS multivibrator is described in the "CMOS/MOS Integrated Circuits Manual", published by RCA Corporation, at pp. 89-104, 1972. Oscillator 103 has a nominal frequency of 40 KHz, which may be adjusted by potentiometer 222. The oscillator signal is differentiated by means of capacitor 246 before application to the clock input of delay flip-flops 201 and 202. Resistor 236 and diode 217 are coupled to capacitor 246 to clamp the differentiated oscillator signal essentially at ground, preventing signal excursions below ground which might damage the clock input of CMOS flip-flops 201 and 202. CMOS flip-flop 201 is connected as a divider and provides a 20 KHz signal at its Q outputs. CMOS flip-flop 202 and transistor 218 of the pulse-width control block 109 provide a pulse-width control signal. The pulse-width control signal from flip-flop 202 and the 20 KHz signal from flip-flop 201 are gated by NAND gates 203 and 204 to provide pulse-width modulated gating signals for enabling drives 107 and 108 of FIG. 1, respectively.

Reference and error amplifier 112 develops the error signal that is proportional to the difference between a reference voltage provided by Zener diode 210 and the DC output voltage. Differential amplifier 209 compares a reference voltage of approximately +7 volts provided by diode 211 and Zener diode 210 with the voltage developed by resistors 223, 219 and 225 from the +24 V DC output voltage. Potentiometer 219 may be adjusted to vary the magnitude of the DC output voltage. The output of differential amplifier 209 is applied via diodes 212 and 213 and resistor 227 to the light-emitting diode (LED) 208 of the optical coupling device. The current through LED 208 is optically coupled to photo-transistor 207 which provides a voltage across resistor 229 that is proportional to the current in LED 208. The pulse-width control circuitry 109 is responsive to the voltage across resistor 229 for developing the pulse-width control signal from flip-flop 202.

Since the reference voltage across Zener diode 210 is developed from the DC output voltage, differential amplifier 209 does not develop an error voltage until energy is transferred via the transformer 116 of FIG. 1 to the output, after initial turn-on or after interruptions of the AC power source. When the error voltage is very small, the pulse-width control circuitry provides a logical high for 5 usec of each 25 usec half-cycle of the 20 KHz signal from flip-flop 201 at the Q output of flip-flop 202, resulting in a minimum duty cycle on the gating signals from NAND gates 203 and 204. Without the start-up circuitry of the present invention, it would take a relatively long time to build up the DC output voltage under full-load conditions.

To enable the switching power supply to start up in a relatively short period of time, e.g. 50 ms, under full load conditions, the start-up control circuitry 111 enables the pulse-width control circuitry 109, to pulse-width modulate the gating signals from NAND gates 203 and 204 at a maximum duty cycle for a short time interval, e.g., 50 ms. In this case, the Q output of flip-flop 202 is a logical high for 14 usec of each 25 usec half-cycle of the 20 KHz signal from flip-flop 201. When AC power is initially applied or returns after an interruption, a positive voltage pulse is applied across resistor 229 via resistor 234, capacitor 244 and diode 214. The positive voltage pulse has a time constant determined by capacitor 244 and the sum of resistor 234 and the resistance determined by resistor 235 in parallel with resistor 229. The positive voltage pulse causes transistor 218 to tend to shut off which in turn allows the Q output of flip-flop 202 to remain in the logical high state longer. Thus, the duty cycle of the gating signals from NAND gates 203 and 204 is maximized to enable the inverting circuitry to build up the DC output voltage. When the DC output voltage builds sufficiently to develop a voltage at resistor 229 which reverse biases diode 214, the start-up control circuitry 111 is disabled and normal regulation is provided by the reference and error amplifier 112. If the AC power is turned-off or interrupted, diode 215 provides a fast discharge path for capacitor 244 and resistor 234.

The circuitry of FIG. 2 can be readily assembled using the standard components listed in Table I. Additional capabilities, such as overcurrent protection for the DC output voltage and for transistors 114 and 115 of FIG. 1, can be provided by connections to appropriate points in the control circuitry of FIG. 2. A conventional overcurrent detection circuit for the DC output voltage may be coupled to the LED 208, and for the transistors 114 and 115 to the reset input of flip-flop 202.

TABLE 1

| Parts List For Circuitry of FIG. 2 | |
| --- | --- |
| Flip-Flop (201, 202) | Motorola MC14013 |
| Gates (203–206) | National Semiconductor MM74COON |
| Optical Isolator (207, 208) | 4N25 |
| Op Amp (209) | MC14741 |
| Zener diode (210) | Silicon 6.8V, 1N957 |
| Diodes (211–216) | Silicon, 1N914 |
| Diode (217) | Germanium, 1N95 |
| PNP Transistors (218) | Silicon, Motorola MPS6522 |
| Potentiometer (219) | 1K Ohms |
| Potentiometer (220) | 5K Ohms |
| Potentiometer (221) | 50K Ohms |
| Potentiometer (222) | 5K Ohms |
| Resistor (223) | 7.87K Ohms |
| Resistor (224) | 1.5K Ohms |
| Resistor (225) | 3.09K Ohms |
| Resistor (226) | 255K Ohms |
| Resistor (227) | 2.8K Ohms |
| Resistor (228) | 56K Ohms |
| Resistor (229) | 169 Ohms |
| Resistor (230, 232) | 1K Ohms |
| Resistor (231) | 16.9K Ohms |
| Resistor (233) | 680 Ohms |
| Resistor (234) | 3.3K Ohms |
| Resistor (235) | 180K Ohms |
| Resistor (236) | 12K Ohms |
| Resistor (237) | 18.7K Ohms |
| Resistor (238) | 100K Ohms |
| Capacitor (239) | 0.01 $\mu$F |
| Capacitor (240) | 470 pF |
| Capacitor (241) | 0.15 $\mu$F |
| Capacitor (242) | 0.002 $\mu$F |
| Capacitor (243) | 560 pF |
| Capacitor (244) | 2.2 $\mu$F |
| Capacitor (245) | 0.001 $\mu$F |
| Capacitor (246) | 100 pF |
| Capacitor (247) | 390 pF |

I claim:

1. A switching power supply adapted to provide a DC output voltage from an AC input voltage supplied by an AC voltage source, comprising:
   transformer inverting means responsive to a pulse-width modulated gating signal for providing a DC output voltage;
   means coupled to the DC output voltage for generating a reference voltage therefrom;
   comparing means for comparing the DC output voltage to the reference voltage and providing an error signal proportional to the difference therebetween;
   control means for providing a gating signal and pulse-width modulating the gating signal in response to the error signal; and
   start-up means responsive to an interruption of the AC input voltage for enabling the control means to pulse-width modulate the gating signal at a predetermined maximum duty cycle for a predetermined time interval following reapplication of the AC input voltage.

2. The switching power supply according to claim 1, wherein said start-up means includes means responsive to the re-application of the AC input voltage for providing a pulse signal having a pulse-width substantially the same as the predetermined time interval, said control circuitry responsive to the pulse signal for pulse-width modulating the gating signal at the predetermined maximum duty cycle.

3. The switching power supply according to claim 2, wherein said start-up means includes means responsive to the interruption of the AC input voltage for resetting the pulse signal providing means.

4. The switching power supply according to claim 2, wherein the pulse signal from the pulse signal providing means has a pulse-width of less than one-hundred milliseconds (100 ms).

5. The switching power supply according to claim 3, wherein the pulse signal providing means includes at least one resistant element and one capacitive element connected in series.

6. The switching power supply according to claim 5, wherein the resetting means includes a diode device having an cathode terminal connected to the capacitive element and a anode terminal connected to ground for providing an electrical path for discharging the capacitive element when the AC input voltage is interrupted.

7. The switching power supply according to claim 5, wherein the pulse signal providing means further includes a diode device having an anode terminal connected to the capacitive element and a cathode terminal for applying the pulse signal to said control circuitry.

* * * * *

UNITED STATES PATENT AND TRADEMARK OFFICE
CERTIFICATE OF CORRECTION

PATENT NO. : 4,344,124
DATED : 8/20/82
INVENTOR(S) : Natalino Panicali

It is certified that error appears in the above—identified patent and that said Letters Patent is hereby corrected as shown below:

Column 6, line 5, delete "resistant" and insert

--resistive--

Signed and Sealed this

Twenty-sixth Day of October 1982

[SEAL]

Attest:

GERALD J. MOSSINGHOFF

Attesting Officer

Commissioner of Patents and Trademarks